United States Patent [19]
Acquaviva

[11] Patent Number: 5,392,109
[45] Date of Patent: Feb. 21, 1995

[54] COMPACT SCANNER

[75] Inventor: Thomas Acquaviva, Penfield, N.Y.

[73] Assignee: Xerox Corporation, Stamford, Conn.

[21] Appl. No.: 167,304

[22] Filed: Dec. 16, 1993

[51] Int. Cl.$^6$ ............................................. G03G 21/00
[52] U.S. Cl. ..................................... 355/320; 355/235
[58] Field of Search ........................ 355/320, 318, 235

[56] References Cited

U.S. PATENT DOCUMENTS

| | | | |
|---|---|---|---|
| 3,575,503 | 4/1971 | Van Auken | 355/318 |
| 3,844,653 | 10/1974 | Kelly | 355/320 X |
| 4,247,192 | 1/1981 | Komori et al. | 355/320 X |
| 4,248,528 | 2/1981 | Sahay | 355/320 X |
| 5,257,064 | 10/1993 | Okamoto | 355/320 X |
| 5,279,453 | 1/1994 | Hashimoto | 355/308 X |

FOREIGN PATENT DOCUMENTS

| | | |
|---|---|---|
| 61-20023 | 1/1986 | Japan . |
| 62-180837 | 8/1987 | Japan . |
| 1-237565 | 9/1989 | Japan . |
| 5-139601 | 6/1993 | Japan . |

Primary Examiner—A. T. Grimley
Assistant Examiner—Nestor R. Ramirez
Attorney, Agent, or Firm—Lloyd F. Bean, II

[57] ABSTRACT

A document handler for a scanner having a scanning assembly for scanning documents including a first imaging station with a slit-like scanning aperture therein through which the scanning assembly scans the document. A transport system is provided for moving the document at a predetermined scanning speed through the second imaging station and across the scanning aperture in a direction substantially perpendicular to the direction of scan by the scanning assembly. The transport system includes a document feed roll, the periphery of the feed roll cooperating with the first imaging station to form a scanning window through which a first side of the document to be scanned passes. An inverter system is provided spaced a predetermined distance from the document feed roll for interchanging a trail edge of the document with the lead edge thereof, the inverter system includes a plurality of nips, one of said nips being an inlet nip for directing the document into a first path, and at least one other of said nips being a rescan nip for directing the document in a second path toward the feed roll for scanning a second side of the document in a duplex mode.

10 Claims, 5 Drawing Sheets

COMPACT SCANNER

FIELD OF THE INVENTION

The present invention relates to a compact scanner, and more particularly to an automatic document handler for such a scanner.

BACKGROUND OF THE INVENTION

By way of background on the general subject of a duplex automatic document handler (DADF) with a stacking input tray at least partially overlying a stacking output tray, and the platen, for a light-lens copier, there is noted the Xerox Corporation "5034" copier document handler, and illustrative Xerox Corp. patents thereon such as U.S. Pat. Nos. 5,000,438 or 5,001,124. However, it may be seen that this is an N to 1, bottom feeder system, and the document path is longer and more complex, including feeding the documents across the full platen width to the end of the output tray which is opposite from the input end of the input tray. Another DADF is disclosed in U.S. Pat. No. 4,941,023, and other art is noted therein on DADF's and coordination with trayless duplex copy sheet loops.

It is known that a constant velocity transport (CVT) (moving document) scanner can provide rapid (more closely spaced) document exchange times at the imaging station, to help, e.g., provide scanning at greater than 50 scanned documents per minute.

There is patent art on CVT duplex (both sides imaged) document handlers specifically for electronic (digital) imaging with a raster input scanner (RIS). A RIS may be either of the full width array (FWA) type, or a smaller RIS CCD array or chip with lens image reduction. Such patents on duplex document handlers specifically for Electronic Front End scanners (EFEs) (and/or digital copiers), include U.S. Pat. No. 4,536,077 issued Aug. 20, 1985 to James C. Stoffel. Also, an XDJ published May/June 1983 by Richard E. Smith, Vol. 8, No. 3 p 263. Both references disclose two separate imaging stations for the two sides of the duplex document, and the latter shows two RIS's. Also noted are U.S. Pat. No. 4,571,636 by Itoh and U.S. Pat. No. 4,429,333, both references disclose using the same CCD array carriage (RIS) for both the duplex CVT image station as for platen scanning, in the same plane, although the two imaging areas are separated.

Also disclosed in the CVT patents are twin-nip CVTs moving the document past a stationary RIS between CVT nips on opposite sides of the RIS, which provides good document motion quality. Also, with angled nips the document can be accurately deformed between the two nips towards the RIS to provide sheet beam strength and positive sheet engagement against the RIS platen or slit.

By way of further background art on various other document feeders specifically for electronic (digital) imaging, noted are U.S. Pat. Nos. 5,026,044; 4,506,301; 4,536,077; 4,380,389; 4,451,030; 4,496,984; and 4,607,951. Also, U.S. Pat. No. 4,295,167 (FIG. 5 especially) or related U.S. Pat. Nos. 4,287,536; 4,496,984; 4,471,386; and 4,447,830 (the latter three show simple straight-through document feeding rather than a folded or inverting document path). Also, U.S. Pat. No. 4,743,974 filed in 1987; and U.S. Pat. No. 4,967,233.

1 to N document sequencing is preferred for scanner (EFE) document input for several reasons. First, it desirably facilitates employing a top feeder and face-up input loading. This enables higher sheet capacities, better sheet separation and feeding reliability, and less smear generation provided by top sheet feeding from a document stack loaded face up; as compared to a bottom of stack sheet separator/feeder. Secondly, 1 to N document input eliminates a non-copying document counting circulation or "precount cycle" for simplex to duplex copying (to make duplex copies from either odd or even numbers of simplex originals). Thirdly, 1 to N input enables correct automatic page numbering concurrently with page image input. Fourthly, it is compatible with existing printer architectures and existing FAX standards, and thus enables one common document handler to be used for both digital copying and FAX. Fifthly, with 1 to N document input, there is no incoming data stream delay before job printing can be started and tested. That is especially important if documents with detailed graphics, or other high pixel count files, are being transmitted by telephone lines or other relatively low bandwidth (and thus low baud rate) communication systems. 1 to N sequencing is also compatible with most electronic filing software.

A simple, relatively inexpensive, and accurate approach to document handling simplex/duplex originals and maintaining 1 to N sequencing in such printing systems has been a goal in the design, manufacture and use of electrophotographic printers. This need has been particularly recognized in scanning of a mix set of originals (i.e. simplex and duplex originals) so that the originals can be fed, scanned, inverted (if necessary), and then delivered face down in the proper sequence into the same output tray. The need to provide accurate and inexpensive document handling has become more acute, as the demand for high quality, relatively inexpensive scanners has increased.

The present invention overcomes various of the above-discussed problems of duplex automatic document handlers, and provides various of the above features and advantages.

SUMMARY OF THE INVENTION

In accordance with the invention there is provided a document scanner, comprising an imaging station. There is provided an imaging transport system for moving the document speed through the imaging station. There is provided a scanner positioned to scan a first side of the document moving through the imaging station. There is provided an inverter, spaced a predetermined distance from the imaging transport system for the document and moving the document to the imaging transport system, the scanner scanning a second side of the document moving through the imaging station, said inverter being enabled during scanning of both sides of the document and being inhibited during scanning of only one side of the document.

These and other aspects of the invention will become apparent from the following description used to illustrate a preferred embodiment of the invention read in conjunction with the accompanying drawings.

While the present invention is described primarily in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Figure 7:
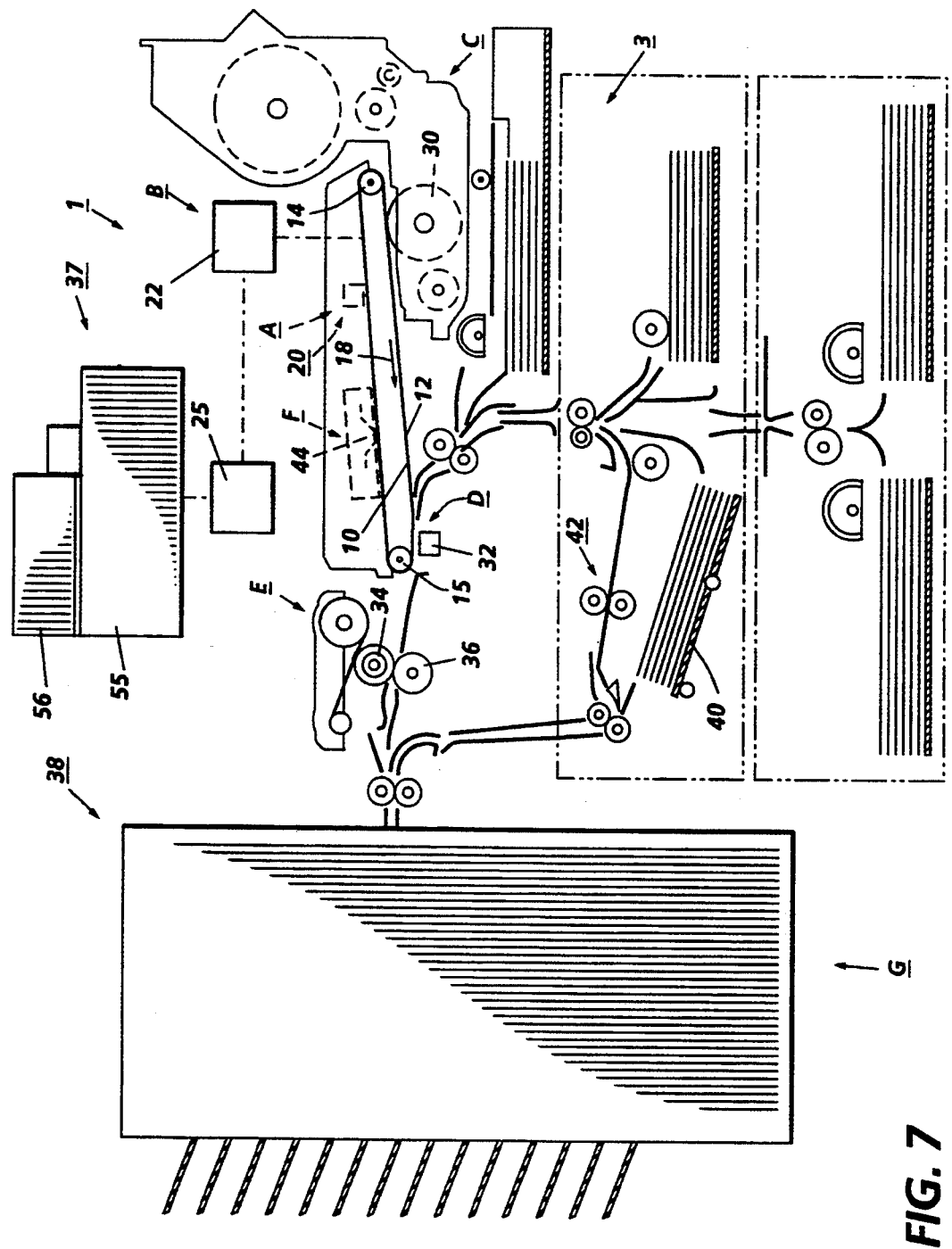
FIG. 7 is a schematic, elevational view depicting an illustrative electrophotographic printing machine incorporating the compact scanner of the present invention.

FIG. 7 schematically depicts an illustrative electrophotographic printing machine, such as disclosed in U.S. Pat. No. 5,258,817 in which the contents of which are incorporated by reference herein. While a specific printing machine is shown and described, the present invention may be used with other types of printing systems such as ink jet, ionographic, etc. Specifically, the printing machine 1 of FIG. 7 has both a copy sheet transport system 3 for transporting sheets of material such as paper, mylar and the like, to and from processing stations of the machine 1. The machine 1, has conventional imaging processing stations associated therewith, including a charging station A, an imaging/exposing station B, a development station C, a transfer station D, a fusing station E, a cleaning station F and a finishing station G. The machine 1 has a photoconductive belt 10 with a photoconductive layer 12. The belt 10 is entrained about a drive roller 14 and a tension roller 15. The drive roller 14 functions to drive the belt in the direction indicated by arrow 18. The drive roller 14 is itself driven by a motor (not shown) by suitable means, such as a belt drive.

The operation of the machine 1 can be briefly described as follows:

A document is scanned by compact scanner 37 with array. The array provides image signals or pixels representative of the image scanned which after suitable processing by processor 25, are output to light source 22. Processor 25 converts the analog image signals output by the array to digital and processes the image signals as required to enable machine 1 to store and handle the image data in the form required to carry out the job programmed. Processor 25 also provides enhancements and changes to the image signals such as filtering, thresholding, screening, cropping, reduction-/enlarging, editing, etc.

The photoconductive belt 10 is charged at the charging station A by a corona generating device 20. The charged portion of the belt is then transported by action the drive roller 14 to the imaging/exposing station B where a latent image is formed on the belt 10 by light source 22. In this case, it is preferred that the light source is a raster output scanning device (a ROS) which is driven in response to signals from processor 25.

The portion of the belt 10 bearing the latent image is then transported to the development station C where the latent image is developed by electrically charged toner material from a magnetic developer roller 30 of the developer station C. The developed image on the belt is then transported to a transfer station D where the toner image is transferred to a copy sheet substrate transported in the copy sheet transport system 3. In this case, a corona generating device 32 is provided to attract the toner image from the photoconductive belt 10 to the copy sheet substrate. The copy sheet substrate with image thereon is then directed to the fuser station E. The fuser at station E includes a heated fuser roll 34 and backup pressure roll 36. The heated fuser roll and pressure roll cooperate to fix the image to the substrate. The copy sheet then, as is well known, may be selectively transported to an output tray (not shown) through a finishing device 38 or along a selectable duplex path including apparatus for buffered duplexing and for immediate duplexing (i.e., tray 40 and path 42 in the case of the illustrative printing machine of FIG. 7). The portion of the belt 10 which bore the developed image is then transported to the cleaning station F where residual toner and charge on the belt is removed in a conventional manner by a blade edge 44 and a discharge lamp (not shown). The cycle is then repeated.

The foregoing description should be sufficient to illustrate the general operation of an electrophotographic printing machine.

Figure 1:
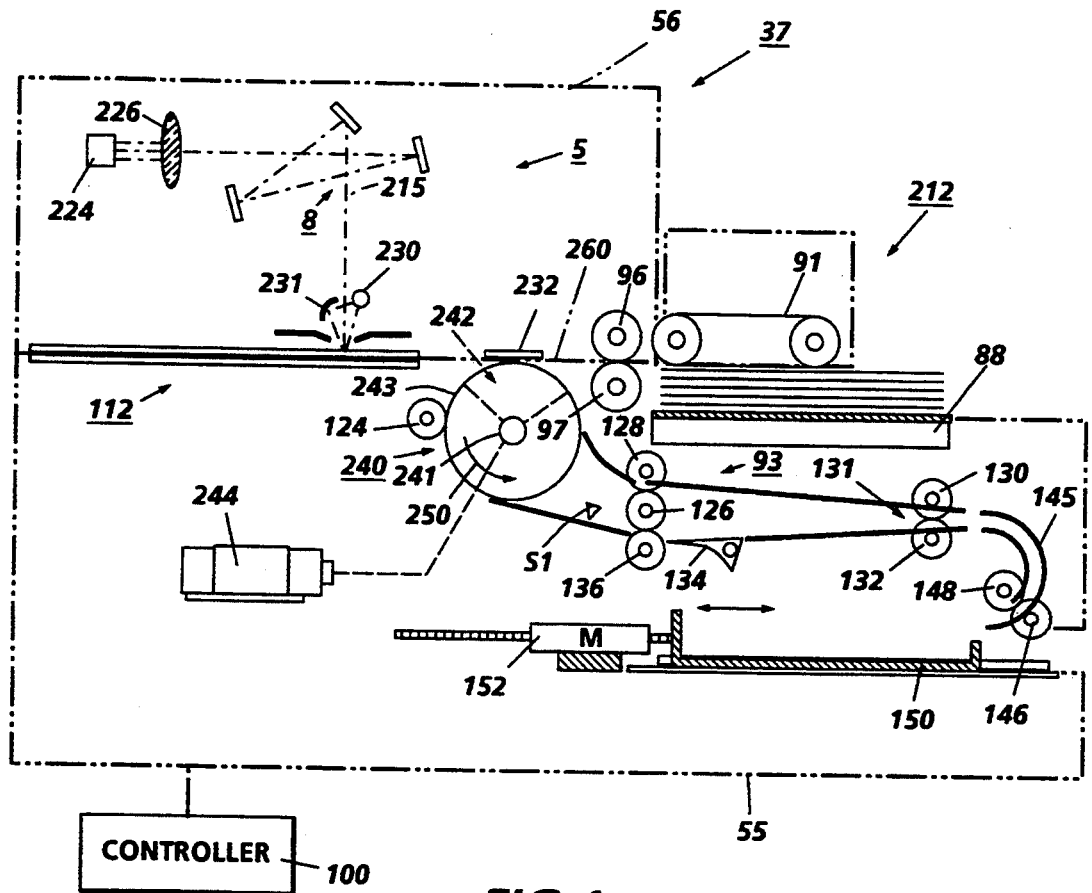
FIG. 1 is a schematic, elevational view depicting the compact scanner of the present invention.

The features of the present invention will now be discussed in greater detail with reference to FIG. 1 of the drawings. FIG. 1 depicts the input portion of an printing apparatus, which is preferably a conventional electrophotographic printing machine incorporating a compact scanner 37. It will become evident from the following discussion that the compact scanner 37 is equally well suited for use in a wide variety of imaging apparatus, and is not necessarily limited in its application to the particular machine 1. The compact scanner 37 illustrated in FIG. 1 is shown as a modular unit having a housing 55. The housing 55 is detachably mounted to a printing apparatus by a conventional fastening arrangement (not shown). While the compact scanner 37 is described as a modular unit mountable to a printing apparatus by way of the housing 55, it is also contemplated that the compact scanner 37 could be constructed as an integral part of a printing machine 1.

The control of all sheet feeding in compact scanner 37 is, conventionally, by the machine controller 100. The controller 100 is preferably a known programmable microprocessor, exemplified by the below cited art. The controller 100 conventionally controls all of the machine steps and functions described herein including the operation of the document conveyor, the document gate and the roller drives, etc. The controller 100 also conventionally provides for storage and comparison of the counts of the copy sheets, the number of documents circulated in a document set, the desired number of copy sets and other selections by the operator through the panel of switches thereon, time delays, jam correction control, etc.

Some examples of various other prior art copiers with document handlers, and especially with control systems therefor, including document sheet detecting switches, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in this art, and in general, how to program and execute document handler and copier control functions and logic with conventional or simple software instructions for conventional microprocessors. This is taught by the above and other patents and various commercial copiers. Such software may vary depending on the particular function and particular microprocessor or microcomputer system utilized, of course, but will be available to or readily programmable by those skilled in the applicable arts without experimentation from either descriptions or prior knowledge of the desired functions together with general knowledge in the general software and computer arts. It is also known that conventional or specified document handling functions and controls may be alternatively conventionally provided utilizing various other known or suitable logic or switching systems.

Referring to FIG. 1, there is shown compact scanner 37. Cover 56 is pivotally mounted so that an operator can lift cover 56 and place a document on support surface member 112. Scanning assembly 5 is disposed within cover 56. In manual mode scanning, a document is placed face up on support surface member 112 so it can be incrementally scan-illuminated by scanning assembly 5. The document is scanned from left to right by scanning assembly 5. Scanning assembly 5 is adapted to travel along a path parallel to and above support surface member 112 by means of a carriage. Scanning assembly 5 illuminates an incremental line portions of the document. The reflected image is reflected by mirror assembly 8. The document image is projected along the optical path through reduction lens 226 onto a solid state photosensor array 224. Array 224, in a preferred embodiment, comprises a 1024 element CCD array of sufficient width to sense the entire image projected through lens 226. A lamp 230 illuminates the document image area thereover. To enhance illumination, a reflector 231 is disposed on the other side of the optical path 215 across from lamp 230, reflector 231 serving to reflect light emitted by lamp 230. Each photosensor generates an electrical video image signal corresponding to a detected portion of the original document. The photosensors are sampled successively as each line in the document is scanned to provide a stream of image signals or pixels for each scanned line. The output of array 224 is, thus, a stream of image signals, or pixels which pass to an image processor 25, a subassembly of central processing unit (CPU) (not shown), where the analog image signals are thresholded and converted to a binary digital signal representing either a black or white area of the scanned document. Thus, a digital image, in the form of a serial matrix or bit map representing the entire document, is stored in memory.

Alternatively, in an automatic mode the document can be scanned by employing a constant velocity transport (CVT) feed roller 240. The scanning carriage is moved to and parked at the CVT document imaging position for alternative imaging (as shown in FIGS. 2-5). A slit-like scanning aperture (not shown) is provided in viewing element 232, the longitudinal axis of the aperture extends in the direction substantially perpendicular to the direction of movement of the document on feed roller 240.

A document handler module 212 is disposed adjacent to feed roll 240 and document handler module 212 includes a elevator tray 88, a conveyor 91 and transport rollers 96 and 97. Documents are loaded face up (1−N) on elevator tray 88. Elevator tray 88 is raised or lower by controller 100 to maintain a feeding height of the document stack so that conveyor 91 can fed documents to transport rollers 96 and 97. The transport rollers 96 and 97 transport the document to document feed roll 240 rotatably mounted below the scanning aperture and the viewing element 232 therein. As will appear, feed roll 240 serves to move and uniformly hold the document to be scanned across the viewing element 232. Feed roll 240 comprises an internal core member or shaft 241, normally metal, having a vacuum cylinder 243 thereabout. Only the top section of vacuum cylinder 243 is utilized for scanning. This may be accomplished by a "V" shaped manifold 242 inside the vacuum cylinder 243 which confines the applied vacuum to only that minor area of vacuum cylinder 243 to insure vacuum adhesion and driving of the document. The manifold is supplied with a vacuum from blower 244. The remote ends of shaft 241 of roll 240 are rotatably journaled by suitable bearings (not shown) mounted on support member. A motor (not shown) is coupled to shaft 241 by suitable means (not shown), the motor rotates feed roll 240 in the direction shown by the solid line arrow 250 upon energization of motor.

Roller 124 is employed to entrain the document around feed roll 240 so that the document can enter inverter unit 93. Inverter unit 93 consist of three rollers 128, 126 and 136 and are driven by a motor (not shown). The document enters the inverter unit 93 through a nip formed between rollers 126 and 136. Inverter unit 93 is spaced at a predetermine distance so that the trailing edge of the document passes beyond the nip formed by roller 124 and feed roll 240, while the leading edge of the document enters the inverter unit 93. A document gate 134 is positioned adjacent to inverter unit 93. The document gate 134 is controlled by controller 100 to divert the document to either a document output tray 150 or an inverter path 131. The inverter path 131 includes rollers 130 and 132 for transporting the document either back to inverter unit 93 into a nip formed between rollers 126 and 128 or for transporting the document to rollers 148 and 146 around a turn baffle 145. It is also desirable to have rollers 130 and 132 spaced at a predetermine distance from rollers 126 and 136 so that as the trailing edge of the document exits a nip formed between rollers 126 and 136 the leading edge of the document enters a preceding nip formed between rollers 130 and 132.

With the above understanding of the elements and their organization with respect to each other in the system, the operation of the system will be readily understood and appreciated from the following description of its operation.

Figure 2:
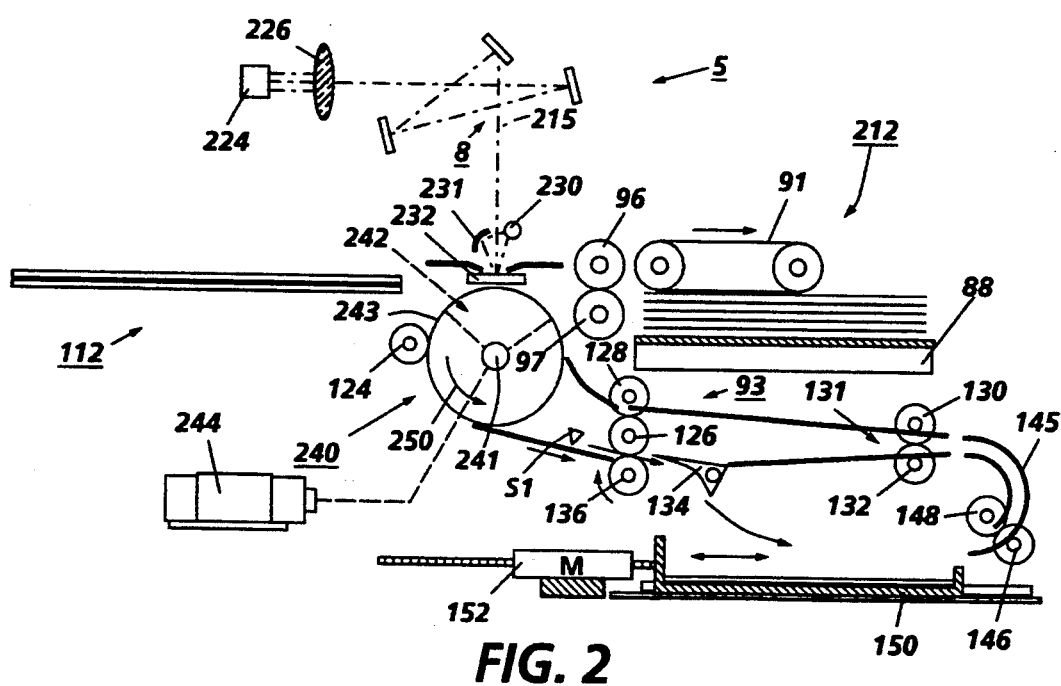
FIG. 2-5 schematically illustrate the exemplary modes of the present, by illustrating in similar elevational views the different exemplary positions of a document of the invention.

In simplex mode operation as shown in FIG. 2, the document moves in the path of the arrows. Documents are put into input tray 88 face-up 1−N. The document sheet is feed out of input tray 88 by conveyor 91 to rollers 96 and 97. The exposure lamp 230 and drive motor are energized, the latter serving to rotate feed roll 240 in a counter clockwise direction shown by arrow 250. At the same time, array 224 is actuated. The leading edge of the document to be scanned is fed forward by rollers 96 and 97 onto feed roll 240. Feed roll 240 carries the document forward below viewing element 232. Scanning assembly 5 scans the document line by line as the document passes thereover. Before the trailing edge of the document passes beyond the nip formed by roller 124 and feed roll 240 the leading edge of the document enters the inverter unit 93 the nip formed between rollers 126 and 136. The rollers 126 and 136 are driving at the same velocity as feed roll 240 when the document is in contact with both nip formed between rollers 126 and 136 and the nip formed between roller 124 and feed roll 240. When the trail edge passes sensor S1 rollers 126 and 136 are driven at a faster velocity to facilitate circulation of the document. Document gate 134 is moved to an upward position and diverts the document which are delivered 1—N face down into document output tray 150.

Figure 3:
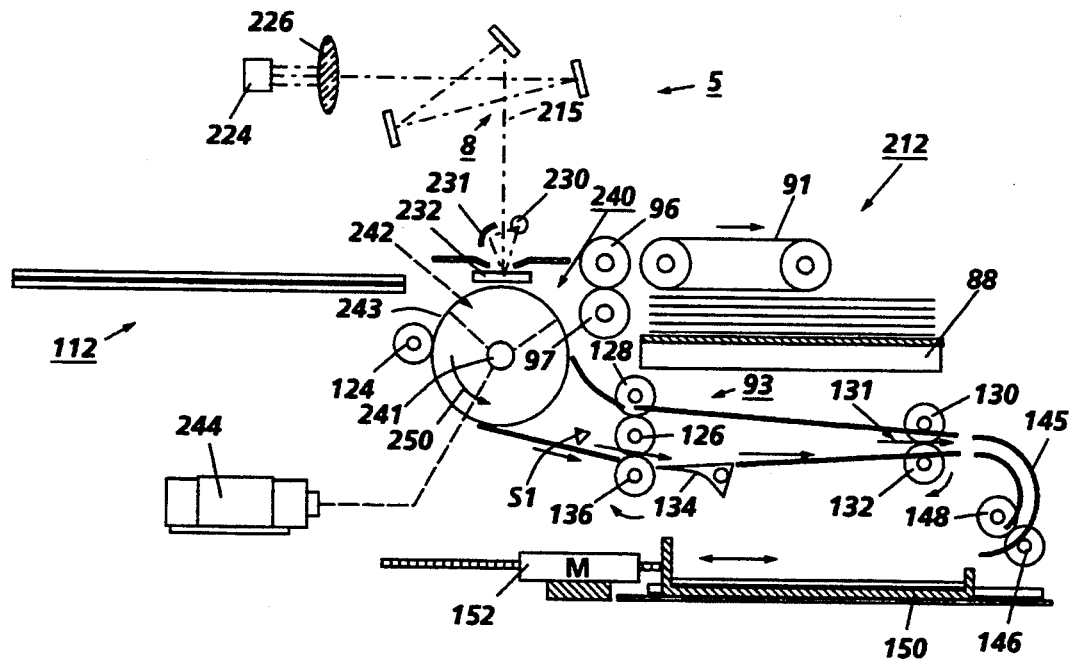
Figure 4:
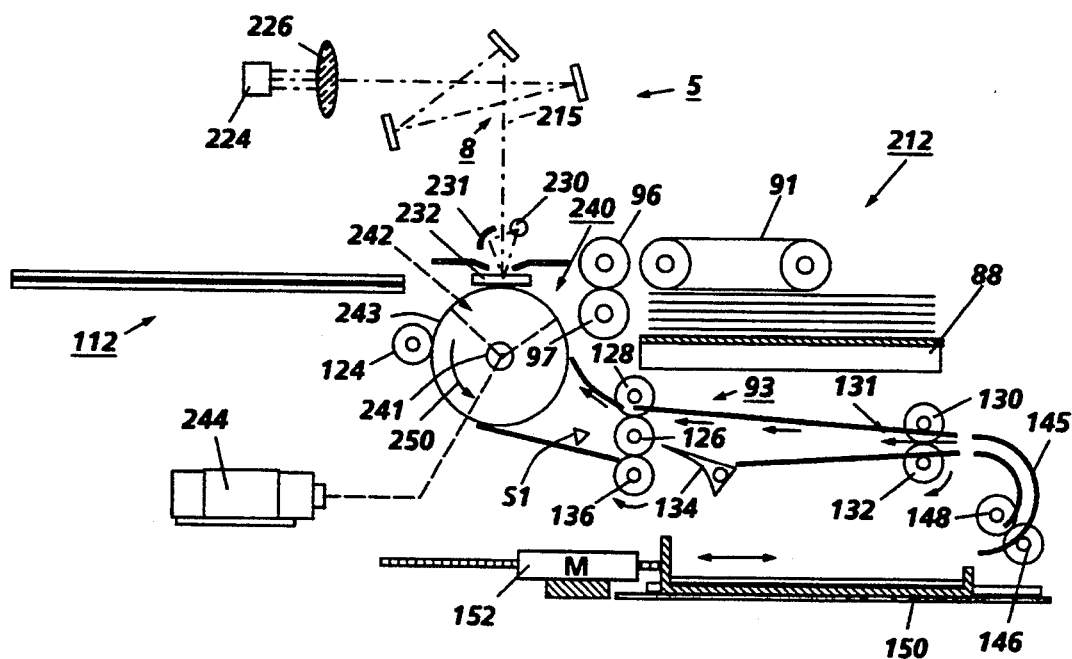
Figure 5:
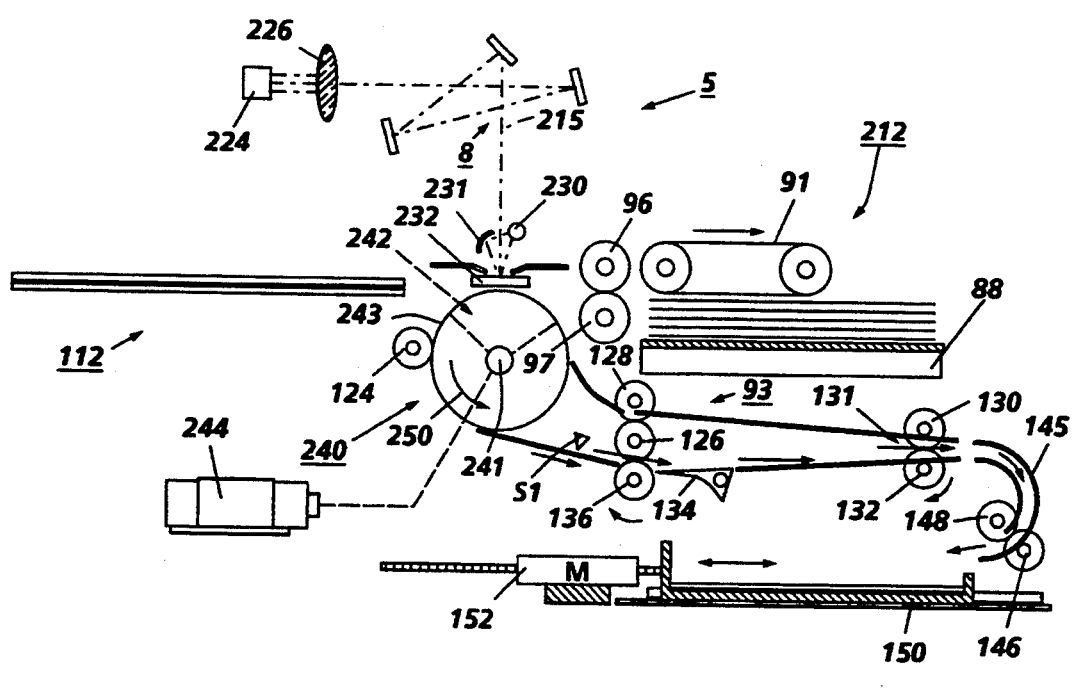

In duplex mode operation as shown in FIGS. 3–5, referring to FIG. 3, the document moves in the path of the arrows. The document sheet is fed out of input tray 88 by conveyor 91 to rollers 96 and 97. The document to be scanned is fed forward by rollers 96 and 97 onto feed roll 240 where the first side of the document is scanned by scanning assembly 5. Before the trailing edge of the document passes beyond the nip formed by roll 240 and roller 124 the leading edge of the document enters the nip formed between rollers 126 and 136 of inverter unit 93. When the trail edge of the document passes sensor S1 rollers 126 and 136 are driven at a faster velocity to facilitate inversion of the document. Document gate 134 is moved to a downward position and diverts the document into inverter path 131. Referring to FIG. 4, the document enter a nip form between rollers 130 and 132. A motor (not shown) drives the rollers 130 and 132 in a clockwise direction to move the document slightly forward so that the trailing end of the document passes beyond the nip formed by rollers 126 and 136. Document gate 134 is moved to a upward position to divert the document into a nip formed by rollers 126 and 128. The drive means drives the rollers 130 and 132 in a direction to move the document slightly backwards so that the trailing end of the document becomes a leading edge and enters the nip formed by rollers 126 and 128. The document moves onto feed roll 240 and the second side of the document is scanned by scanning assembly 5. Before the trailing edge of the document passes beyond the nip formed by roll 240 and roller 124 the leading edge of the document enters the nip formed between rollers 126 and 136 of inverter unit 93. Document gate 134 is moved to a downward position and diverts the document into inverter path 131. Referring to FIG. 5, the document enters a nip form between rollers 130 and 132. A drive means drives the rollers 130 and 132 in a direction to move the document forward to rollers 148 and 146 through turn baffle 145 and whereupon the document is turned over and fed into document output tray 150 so that the documents in output tray 150 are stacked 1—N face down.

One advantageous feature of the present invention is that output tray 150 has a motor drive 152 to extend the output tray in and out to facilitate unloading of the tray. An operator can actuate the motor drive to extend the output tray or a sensor (not shown) can detect the tray full of documents and actuate the motor drive to extend the output tray. When the sensor detects the output tray being empty the output tray is returned. Alternatively, the output tray could be extended when a scanning job is completed.

Another advantageous feature of the present invention is special page programming within a mix set of originals (i.e. two-side and one-sided) can be done. For example, an operator can selectively program which originals which are simplex or duplex. Controller 100 controls the invert unit and the gate so that the mixed set of originals can be placed in the input tray, fed, scanned, inverted for re-scanning (i.e. two-side originals), and then delivered face down in the proper 1—N orientation either passing through the turn baffle (i.e. two-side originals) or diverted by the gate into the output tray (one-sided originals). Alternatively, special page programming can be done automatically. For example, a low resolution sensor be used for (S1) to detect both the presence of information on the second side of the original after the first side of the original is scanned and to detect the trail edge of the original. If the sensor detects information on the original a signal is sent to controller 100 to duplex the original. If no signal is sent, the original is simplex.

Yet another advantageous feature of the present invention, in particular the embodiment of the present invention illustrated in FIG. 1 is that document handler module 212 is the only part of the device above the imaging plane as define by line 260, as a result an operator does not have to lift the entire document handler to access originals; either to load them in manual mode scanning, clear jams, or remove originals. The components shown in housing 55 can slide out on drawers (not shown) thereby enhancing operability and facilitating increase latitude in setting the overall height of the compact scanner.

Figure 6:
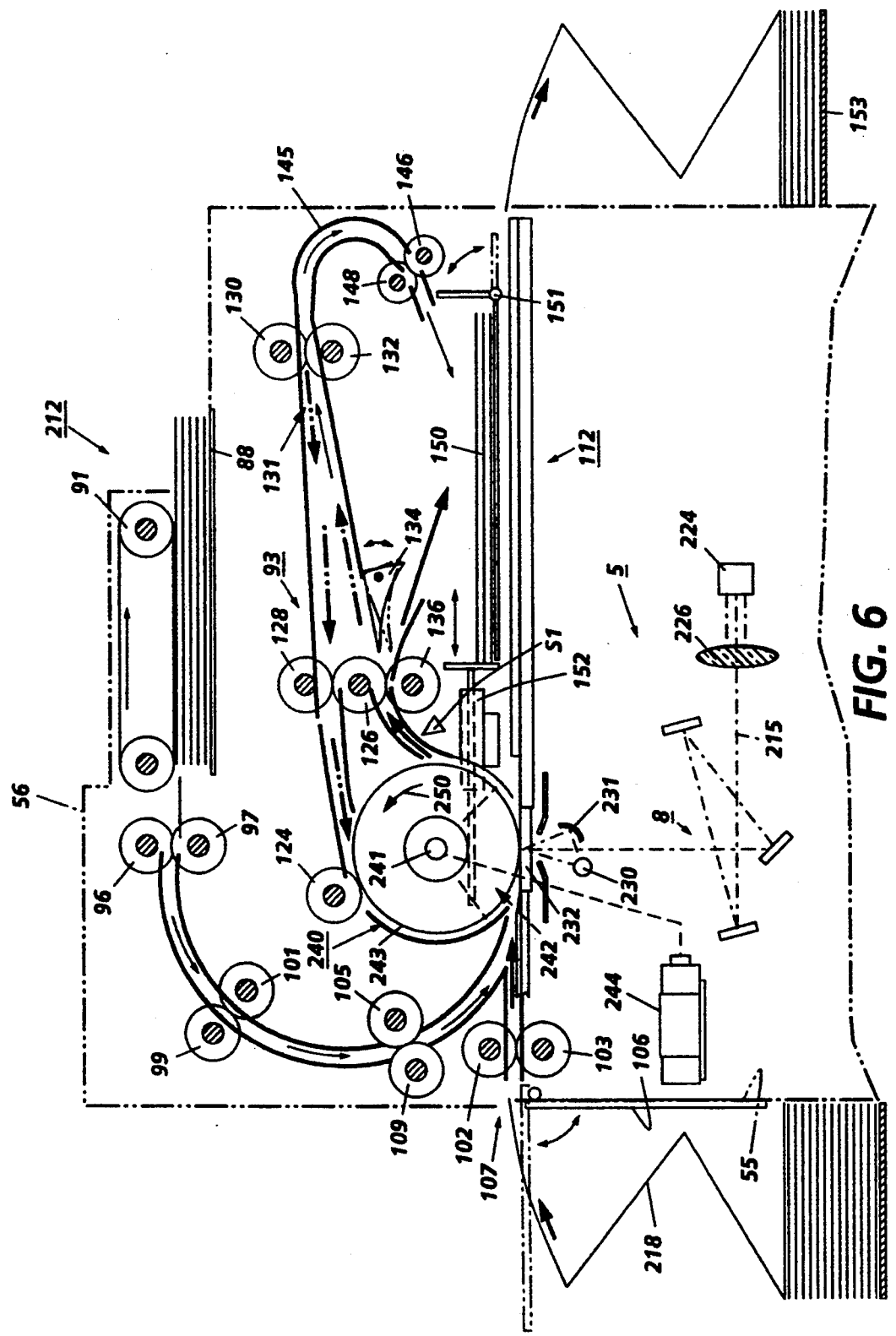
FIG. 6 is a schematic, elevational view depicting another embodiment of the present invention.

FIG. 6 is another embodiment of the present invention. Cover 56 is pivotally mounted. Cover 56 contains document handler module 212, feed roller 240, and output tray 150. Document handler module 212 is positioned above feed roll 240. Scanning assembly 5 is disposed under support surface member 112. Support surface member 112 is transparent so that the document can be manually scanned in a face down position by scanning assembly 5. Moreover, other advantageous features are present and will be describe with the foregoing description of its operation.

In manual mode scanning, an operator can lift cover 56 and place a document on the support surface member 112. The document is placed face down on support surface member 112 and is incrementally scan-illuminated by scanning assembly 5 is traveling along a path parallel to and below support surface member 112.

Alternatively, in an automatic mode the document can be scanned by employing a constant velocity transport (CVT) feed roller 240. The scanning carriage is moved to and parked at the CVT document imaging position for alternative imaging. A slit-like scanning aperture (not shown) is provided in viewing element 232, the longitudinal axis of the aperture extends in the direction substantially perpendicular to the direction of movement of the document.

In simplex mode operation as shown in FIG. 6, the document sheet is feed by conveyor 91 to rollers 99 and 101. The exposure lamp 230 and drive motor are energized, the latter serving to rotate feed roll 240 in a counter clockwise direction shown by arrow 250. At the same time, array 224 is actuated. The leading edge of the document to be scanned is fed forward by rollers 99 and 101 onto feed roll 240. Feed roll 240 carries the document forward across viewing element 232. Scanning assembly 5 scans the document line by line as the document passes thereover. Before the trailing edge of the document passes beyond roll 240 the leading edge of the document enters the inverter unit 93 the nip formed between rollers 126 and 136. The rollers 126 and 136 are driving at the same velocity as feed roll 240 when the document is in contact with nip formed between rollers 126 and 136 and on feed roll 240. When the trail edge passes sensor S1 rollers 126 and 136 are driven at a faster velocity to facilitate circulation of the document. Document gate 134 is moved to an upward position and diverts the document into document output tray 150.

In duplex mode operation also shown in FIG. 6, the document sheet is fed by conveyor 91 to rollers 99 and 101. The document to be scanned is fed forward by rollers 99, 101,105 and 109 onto feed roll 240 and the first side of the document is scanned by scanning assembly 5. Before the trailing edge of the document passes beyond roll 240 the leading edge of the document enters the nip formed between rollers 126 and 136 of inverter unit 93. Document gate 134 is moved to a downward position and diverts the document into inverter path 131. Referring to FIG. 6, the document enter a nip form between rollers 130 and 132. A motor (not shown) drives the rollers 130 and 132 in a direction to move the document slightly forward so that the trailing end of the document passes beyond the nip formed by rollers 126 and 136. Document gate 134 is moved to a upward position to divert the document into a nip formed by rollers 126 and 128. The drive means drives the rollers 130 and 132 in a direction to move the document slightly backwards so that the trailing end of the document becomes a leading edge and enters the nip formed by rollers 126 and 128. The document moves into the nip formed by roller 124 and feed roll 240 and then onto the feed roll 240 and the second side of the document is scanned. Before the trailing edge of the document passes beyond roll 240 the leading edge of the document enters the nip formed between rollers 126 and 136 of inverter unit 93. Document gate 134 is moved to a downward position and diverts the document into inverter path 131. The document enter a nip form between rollers 130 and 132. A motor drives the rollers 130 and 132 in a direction to move the document forward to rollers 148 and 146 through a turn baffle 145 and whereupon the document is turned over and fed into document output tray 150 so that the documents in output tray 150 are stacked 1−N face down.

In manual feeding operation a document input 107 is employed. For a single document feeding loading tray 106 is positioned in a horizontal position. An operator feeds the document image side down until the document enters a nip form by rollers 102 and 103. The document is transported onto feed roll 240 and the document is scanned by scanning assembly 5. Before the trailing edge of the document passes beyond roll 240 the leading edge of the document enters the nip formed between rollers 126 and 136 of inverter unit 93. Document gate 134 is moved to an upward position and diverts the document into document output tray 150.

In form feeding operation as shown in FIG. 6, document input 107 is employed. The form feeding loading tray 106 is positioned in a downward position. An operator feeds the form image side down until the form enters a nip formed by rollers 102 and 103. The form is transported onto feed roll 240 and the form is scanned by scanning assembly 5. The leading edge of the form 218 enters the nip formed between rollers 126 and 136 of inverter unit 93. Document gate 134 is moved to an upward position and diverts the form 218 into document output tray 150. Alternatively, document tray pivot 151 can be rotated down and the forms can be stacked on tray 153.

All references cited in this specification, and their references, are incorporated by reference herein where appropriate for appropriate teachings of additional or alternative details, features, and/or technical background.

It is, therefore, apparent that there has been provided in accordance with the present invention, a document handler apparatus that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A document scanner, comprising:
    a document input tray for holding documents in a predetermined sequence;
    a document output tray for receiving documents;
    an imaging station;
    an imaging transport system for moving the documents received from said document input tray through said imaging station;
    a scanner positioned to scan a first side of the documents moving through said imaging station;
    a first inverter, spaced a predetermined distance from said imaging transport system for moving the documents to said imaging transport system, so that said scanner is scanning a second side of the documents moving through said imaging station, said first inverter being operative during scanning of both sides of the documents and being inoperative during scanning of only side of the documents;
    a second inverter, spaced from said first inverter, for moving the document to said output tray; and
    a document gate, spaced between said first inverter and said second inverter, adapted to divert the documents to said output tray in response to said first inverter being inoperative and to divert the document to said second inverter in response to said inverter being operative, so that the documents are received by said output tray are in said predetermined sequence.

2. The document scanner of claim 1, further comprising a second imaging station for supporting a single document to be scanned, said second imaging station comprising a scanning carriage adapted to move said scanner relative to the single document positioned thereon.

3. The document scanner of claim 1, wherein said imaging transport system comprises a document feed roll having a peripheral surface cooperating with said first imaging station to form a scanning window for scanning the document.

4. The document scanner of claim 1, wherein said output tray comprises a delivery system for extending said output tray toward an operator to facilitate unloading of documents therefrom.

5. The document scanner of claim 4, wherein said output tray further comprises a sensor, responsive to said delivery system, for extending said output tray toward the operator to facilitate unloading of documents from said output tray in response to said sensor detecting a preselected number of documents in said output tray.

6. The document scanner of claim 1, further comprising detection system for detecting a document adapted to have one side or both sides scanned.

7. The document scanner of claim 6, further comprising a controller for enabling or inhibiting said inverter in response to said detection system detecting that both sides or one side of the document should be scanned.

8. The document scanner of claim 1, further comprising an elevator tray for supporting a plurality of documents up to be transported by said transport system.

9. The document scanner of claim 1, further comprising a single document input for feeding single documents to said transport system.

10. The document scanner of claim 9, wherein the single document comprises a computer form.

* * * * *